United States Patent
Carlu et al.

(10) Patent No.: US 12,036,681 B2
(45) Date of Patent: Jul. 16, 2024

(54) METHOD FOR TEMPORAL SYNCHRONIZATION BETWEEN AN AUTOMATIC MOVEMENT MEANS AND A CONTACTLESS DETECTION MEANS ARRANGED ON SAID AUTOMATIC MOVEMENT MEANS

(71) Applicant: SAINT-GOBAIN GLASS FRANCE, Courbevoie (FR)

(72) Inventors: Adrien Carlu, Amiens (FR); Alexandre Marlier, Pontoise les Noyon (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 439 days.

(21) Appl. No.: 17/429,550

(22) PCT Filed: Mar. 13, 2020

(86) PCT No.: PCT/EP2020/056933
§ 371 (c)(1),
(2) Date: Aug. 9, 2021

(87) PCT Pub. No.: WO2020/187776
PCT Pub. Date: Sep. 24, 2020

(65) Prior Publication Data
US 2022/0118623 A1    Apr. 21, 2022

(30) Foreign Application Priority Data
Mar. 21, 2019    (FR) ....................................... 1902931

(51) Int. Cl.
*B25J 9/16*    (2006.01)
*G05B 19/401*    (2006.01)

(52) U.S. Cl.
CPC .......... *B25J 9/1692* (2013.01); *B25J 9/1653* (2013.01); *B25J 9/1664* (2013.01); *B25J 9/1684* (2013.01);
(Continued)

(58) Field of Classification Search
CPC ...... B25J 9/1692; B25J 9/1653; B25J 9/1664; B25J 9/1684; B25J 9/1697;
(Continued)

(56) References Cited

U.S. PATENT DOCUMENTS 9,211,643 B1 *  12/2015  Shirakyan ............... B25J 9/1674
2017/0276474 A1 *  9/2017  Shimada ................ G01B 11/24
(Continued)

FOREIGN PATENT DOCUMENTS

| DE | 10 2005 016323 A1 | 10/2006 |
| JP | H01-187403 A | 7/1989 |

OTHER PUBLICATIONS

International Search Report as issued in International Patent Application No. PCT/EP2020/056933, dated May 18, 2020.
(Continued)

*Primary Examiner* — Sohana Tanju Khayer
(74) *Attorney, Agent, or Firm* — Pillsbury Winthrop Shaw Pittman LLP

(57) ABSTRACT

A method for temporal synchronization between an automatic movement device and a contactless detection device arranged on the automatic movement device in order to measure a physical parameter along at least one and the same defined trajectory along the surfaces of a plurality of materials to be evaluated.

19 Claims, 3 Drawing Sheets

(52) U.S. Cl.
CPC ............ B25J 9/1697 (2013.01); *G05B 19/401* (2013.01); *G05B 2219/37532* (2013.01)

(58) Field of Classification Search
CPC ........ G05B 2219/37532; G05B 19/401; G05B 19/41875; Y02P 90/02
See application file for complete search history.

(56) References Cited

U.S. PATENT DOCUMENTS

| | | | |
|---|---|---|---|
| 2018/0004004 A1* | 1/2018 | Tamasanis | G02B 27/62 |
| 2018/0158200 A1* | 6/2018 | Metzler | G01C 15/00 |
| 2018/0232947 A1* | 8/2018 | Nehmadi | G01S 7/295 |
| 2021/0398300 A1* | 12/2021 | Gupta | G06T 7/73 |

OTHER PUBLICATIONS

Anonymous: "How can I synchronize EMG and acceleration data?," Internet, Jun. 6, 2016, XP055612762, Retrieved from the Internet: URL:https://www.researchgate.net/post/How_can_I_synchronize_EMG_and_acceleration_data, [retrieved Aug. 14, 2019], 9 pages.

* cited by examiner

METHOD FOR TEMPORAL SYNCHRONIZATION BETWEEN AN AUTOMATIC MOVEMENT MEANS AND A CONTACTLESS DETECTION MEANS ARRANGED ON SAID AUTOMATIC MOVEMENT MEANS

CROSS-REFERENCE TO RELATED APPLICATIONS

This application is the U.S. National Stage of PCT/EP2020/056933, filed Mar. 13, 2020, which in turn claims priority to French patent application number 1902931 filed Mar. 21, 2019. The content of these applications are incorporated herein by reference in their entireties.

The invention relates to a method for temporal synchronization between an automatic movement means and a contactless detection means arranged on said automatic movement means in order to measure a physical parameter along at least one and the same defined trajectory along the surfaces of a plurality of materials to be evaluated.

In the context of quality control on glass products, such as glass panels, at the end of production, it is common to use detection means integrated into the production line in order to measure certain parameters or certain physicochemical and/or optical properties on the products in order to isolate and eliminate those of them that do not meet the target values for these parameters or properties.

These detection means are more often than not in physical contact with the products in order to avoid contaminating or altering their surface in any way. They may be fixed or mobile. When they are mobile, they may be fastened to an automatic movement means in order to travel certain defined trajectories along the surfaces or envelopes of the products.

One difficulty in this type of system is that of temporal synchronization between the movement of the movement means and the signals emitted by the detection means. Specifically, each of the means is generally managed by control modules that are dedicated thereto and are independent of one another. The control module of the automatic movement means may for example be managed using a programmable device, such as a computer complex, to which it will transmit its spatial coordinates in real time at a specific transmission frequency. The same programmable device may be interfaced with the control module of the contactless detection means, but the acquired signals are transmitted independently at another frequency. The sampling rate of the values of the parameters or properties measured by the detection means will vary depending on the ratio between the two frequencies. If the transmission frequency of the spatial coordinates is lower than the detection frequency, the sampling rate becomes high, and it is then generally difficult to determine the actual value of the parameter or of the property corresponding to a spatial coordinate transmitted at a given time by the control module of the movement means. On the other hand, if the transmission frequency of the spatial coordinates is higher, the sampling rate is too low, and it is generally difficult to determine the spatial coordinate corresponding to each measured parameter or property value.

An additional difficulty arises when the origins of the times between the automatic movement means and the contactless detection means are different. The lack of a temporal reference frame does not allow a match to be achieved between the spatial coordinates and the measured parameter or property values. The measurement is then inaccurate or even useless as it is not possible to determine whether the product in question actually meets the set quality criteria at a measurement point along the surface of its envelope.

The present invention solves these problems. The method according to the invention is particularly suitable for systems for measuring a physical parameter along a trajectory on surfaces, in particular curved surfaces, such as those that glass panels may have after they are shaped. This method may in particular be used for a device for measuring an optical parameter in order to determine geometrical discrepancies between a surface of a reference material and the surfaces of a plurality of materials to be evaluated.

In the remainder of the text, reference is made to the elements in the figures in their various views.

Figure 1:
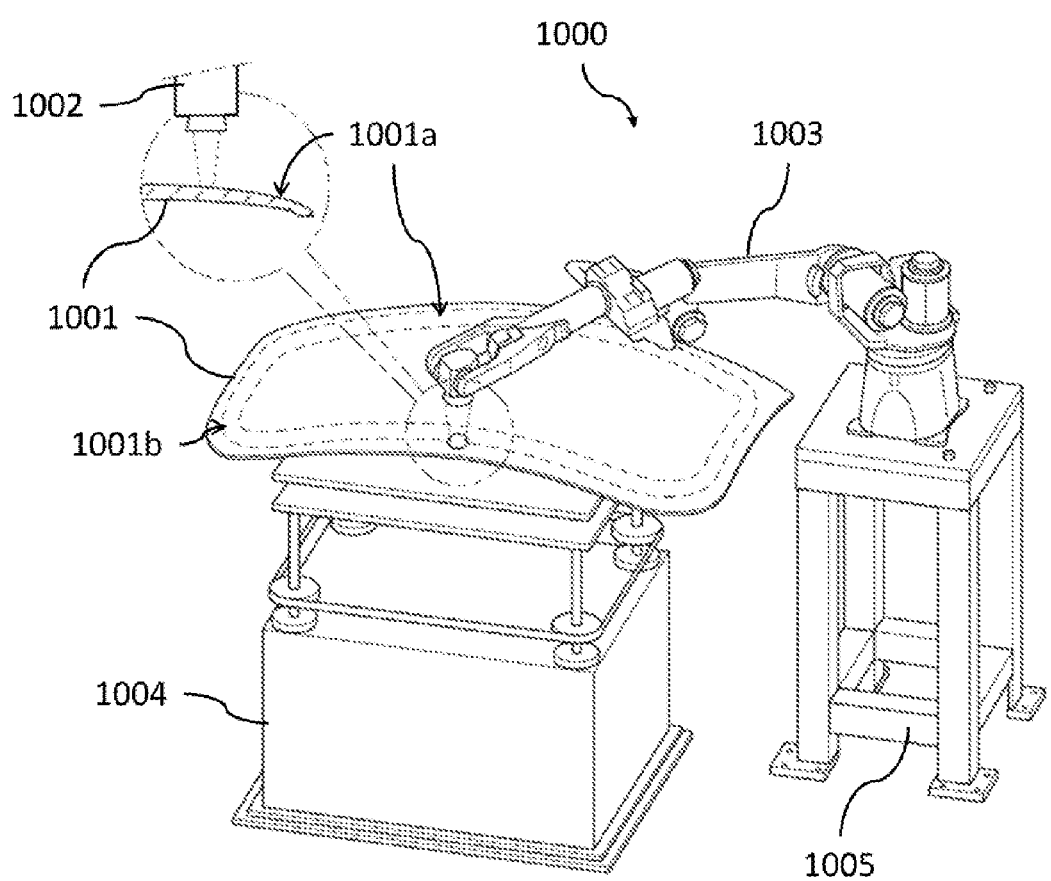
FIG. 1 is a schematic depiction of an exemplary system comprising an automatic locomotion means and a contactless detection means.

FIG. 1 schematically shows an exemplary system comprising an automatic movement means and a contactless detection means. This example is provided purely by way of illustration in order to make it easier to understand the invention described below. The invention may be adapted to any type of similar system without requiring particular effort for a person skilled in the art, this also being an advantage of the invention.

The system shown as an example in FIG. 1 is a system for automatically measuring discrepancies in terms of elevational geometry or curvature between the curved surfaces 1001a of a plurality of materials 1001 to be evaluated and a curved surface 1001a of a reference material 1001.

The system comprises an assembly formed by
at least one automatic movement means 1003 designed to travel at least one trajectory 1001b defined along the curved surfaces 1001a, and
at least one contactless detection means 1002 designed to measure the elevational height or curvature of curved surfaces 1001a, arranged on the automatic movement means 1003 and synchronized with the movements of said automatic movement means 1003.

The system is generally configured so as to:
measure, at selected measurement points along a defined trajectory 1001b, the elevational height profile or curvature profile of the curved surface 1001a of the reference material 1001, and
measure the elevational height profile or curvature profile of the curved surface 1001a of each material 1001 to be evaluated, at the same selected measurement points along the same trajectory 1001b, under the same conditions of traveling said trajectory 1001b by way of the automatic movement means 1003 and at the same acquisition angle by the contactless detection means 1002 at the same measurement point as for the curved surface 1001a of the reference material 1001.

The contactless detection means 1002 is arranged or fastened on the automatic movement means 2003 using a fastening means. Any suitable fastening means may be used. The fastening means may preferably have a thermal conductivity that makes it possible to evacuate heat linked to heating of the contactless sensor. Such heating is specifically liable to interfere with the operation thereof, in particular when it is an electronic detection means, through the occurrence of electronic noise interfering with its signal.

The automatic movement means 1003 may be an articulated robotic arm provided with six degrees of freedom.

Using such an articulated arm is advantageous in that it is flexible enough to adapt to any type and any degree of curvature of the curved surfaces. It is made easier to position the contactless detection means with respect to the curved surfaces.

The contactless detection means 1002 may be a chromatic confocal sensor.

As explained in the introduction, a first difficulty that is encountered with the type of system illustrated in the example in FIG. 1 is that of temporal synchronization between the movement of the locomotion means and the signals emitted by the detection means. A second difficulty may be the lack of a temporal reference frame that does not allow a match to be achieved between the spatial coordinates and the measured parameter or property values.

Figure 2:
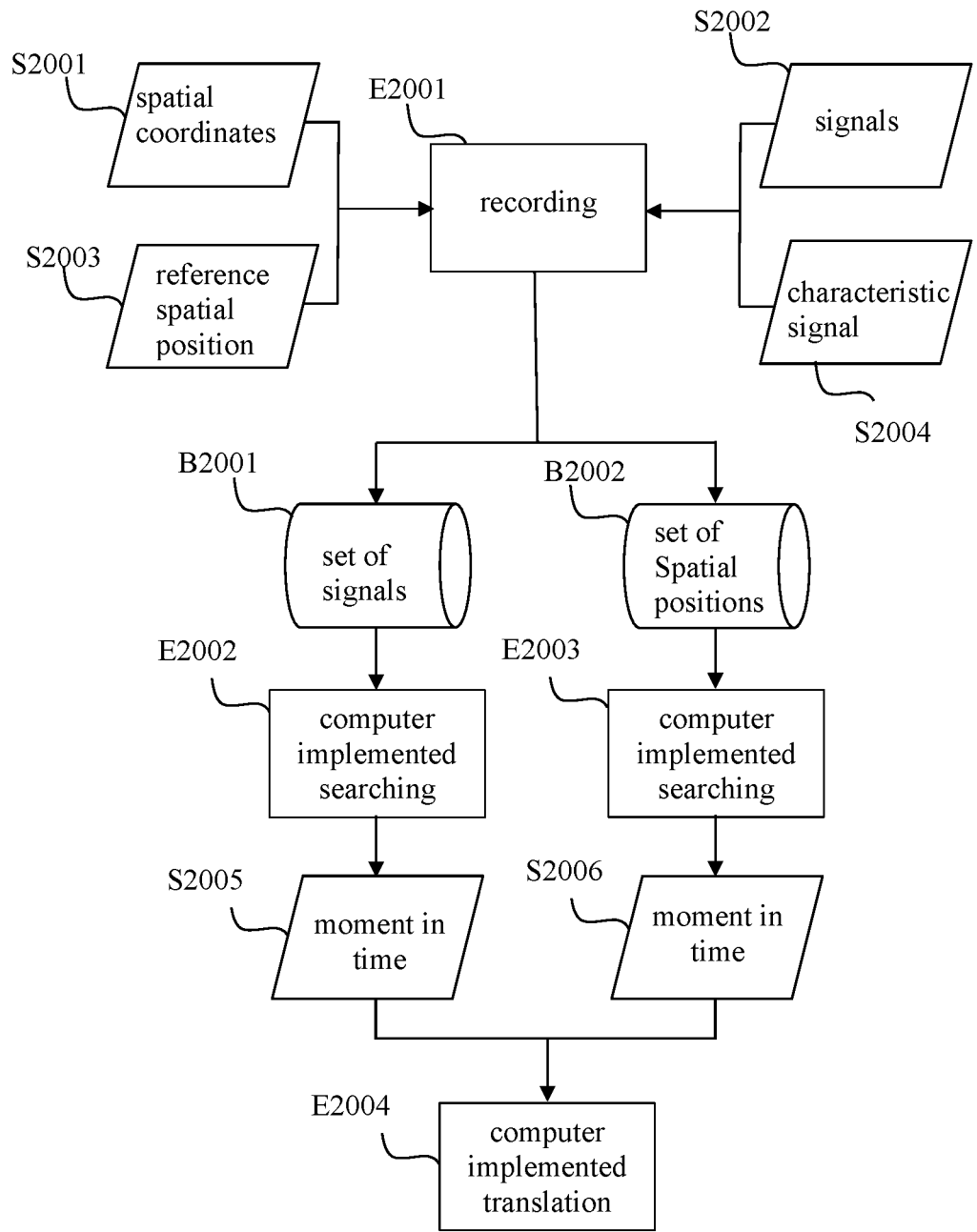
FIG. 2 is a flowchart of the method of the invention.

The invention is illustrated by the flowchart of FIG. 2.

The invention relates to a method for temporal synchronization between an automatic movement means 1003 and a contactless detection means 1002 arranged on said automatic movement means 1003 in order to measure a physical parameter along at least one and the same defined trajectory 1001b on surfaces 1001a of a plurality of materials 1001 to be evaluated, the spatial coordinates S2001 of the automatic movement means 1003 and the signals S2002 acquired by the contactless detection means 1002 being recorded E2001 continuously by a recording means in their respective time scales when the automatic movement means 1003 moves, said method comprising the following steps:

(a) recording E2001, by way of said recording means, of the signal from at least one previously defined reference spatial position S2003 along said trajectory 1001b, and of a characteristic signal S2004 able to be detected by the contactless detection means 1002, said signal being associated with said reference spatial position S2003;

(b) computer-implemented searching E2002, in the set B2001 of signals acquired as a function of time by the contactless detection means 1002, for the moment in time S2005 corresponding to the detection of the characteristic signal S2004 associated with the reference spatial position S2003;

(c) computer-implemented searching E2003, in the set B2002 of spatial positions of the automatic locomotion means, recorded as a function of time, for the moment in time S2006 corresponding to the reference spatial position S2003;

(d) computer-implemented translation E2004 of the respective time scales of the automatic movement means 1003 and of the contactless detection means 1002, such that the moments in time S2003 and S2004 obtained in steps (b) and (c) coincide with one another.

The present method thus results in achieving temporal synchronization of the spatial coordinates of the automatic movement means and the signals acquired by the detection means.

It is possible, and generally common, when using a system such as the one described above and illustrated in FIG. 1, for a drift to occur over a shorter or longer time, the result of which is that the spatial coordinates of the automatic movement means and the signals acquired by the detection means are no longer synchronized with sufficient accuracy.

In order to mitigate this drawback, it is possible to reiterate the execution of the described method as many times as necessary during the use of said system so as to eliminate or at least minimize the effects of the drift. It is then necessary to record E2001, at each iteration of the execution of the method, the previously defined reference spatial position S2003 along said trajectory 1001b, and the characteristic signal S2004 able to be detected by the contactless detection means 1002. It is however possible, at each iteration of the execution of the method, to record another previously defined reference spatial position along said trajectory 1001b, and another characteristic signal able to be detected by the contactless detection means 1002, said other signal being associated with said reference spatial position. These two alternatives may be combined.

In some cases, in particular when the production and/or quality control rates are high, repeating steps (a) to (c) at each iteration is liable to constitute a loss of time. It may then be advantageous for the method to comprise an additional step in order to temporally resynchronize the spatial coordinates of the automatic movement means 1003 and the signals acquired by the detection means 1002 without automatically requiring recording step (a) and subsequent steps (b) and (c) at each iteration of the execution of the method.

Figure 3:
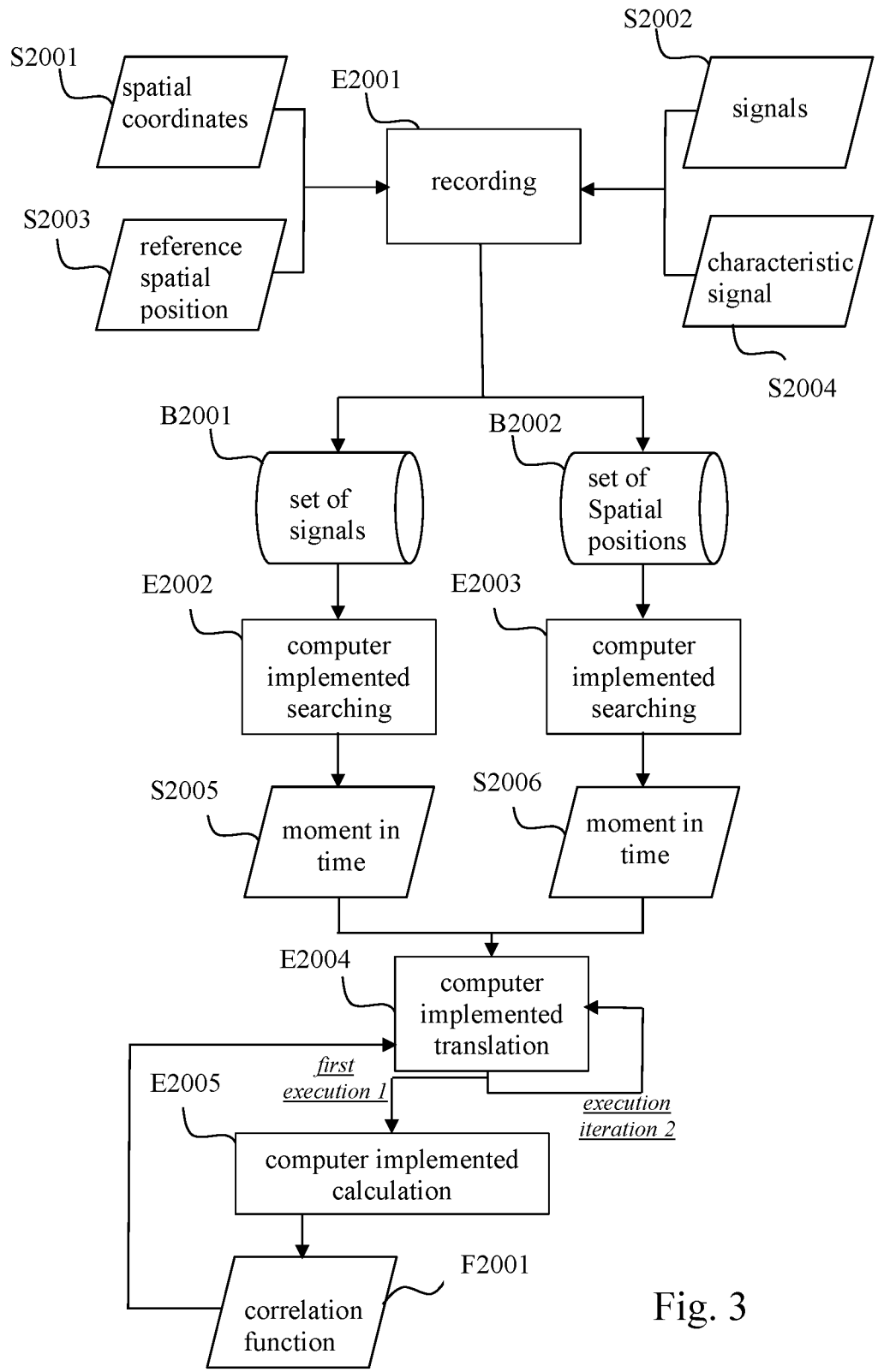
FIG. 3 is a flowchart according to one embodiment of the method of the invention.

One example of such an additional step is illustrated by the embodiment shown by the flowchart of FIG. 3. In this embodiment, the method furthermore comprises, after step (d), a step E2005 (e) of computer-implemented calculation of a statistical correlation function F2001 between the respective time scales of the automatic movement means 1003 and of the contactless detection means 1002, and such that the translation E2004 in step (d) is subsequently performed by way of this correlation function F2001 rather than the moments in time obtained in steps (b) and (c).

Thus, after a first execution (1) of the method, at each subsequent execution iteration (2), rather than repeating steps E2001-E2003 (a) to (c), step E2004 (d) is executed using the correlation function F2001 obtained in step E2005 (e). This embodiment makes it possible to save time, since only step E2004 (d) is subsequently executed.

When using a system such as the one described above and illustrated in FIG. 1, it is possible for a drift to affect the respective control modules of the automatic movement means and of the contactless detection means. In this case, the correlation function may no longer be sufficient to temporally resynchronize the spatial coordinates of the automatic movement means and the signals acquired by the detection means with sufficient accuracy. It is then necessary to execute all of the steps of the method according to the described second embodiment again. This execution may in particular be performed at certain times, for example at regular time intervals, or else when an excessively large drift is observed.

The correlation function may be a scale factor, a linear relationship, or else a statistical learning model.

According to other embodiments of the method of the invention, the spatial position may correspond to a marker arranged at one and the same location on the surfaces to be evaluated, and the characteristic signal may be a signal from said marker. The advantage of using a marker is that the marker may be chosen such that the characteristic signal is different from those coming from the surfaces 1001b of the materials to be evaluated. This allows an accurate and fast search E2003 for said signal from among the set B2001 of signals acquired as a function of time by the contactless detection means 1002. By way of example, the marker may be a reflector or an electromagnetic signal emitter.

For some materials, it may be the case that it is not appropriate to use a marker, in particular due to potential unacceptable contamination of their surfaces by the elements of the marker, or to the shape of their surface, which does not allow the marker to be placed thereon in a manner suitable for detection thereof. The reference position may then advantageously correspond to one and the same point situated on the edge of the surfaces and the characteristic signal may be the absence of a signal.

It is possible to combine this last embodiment with the additional use of a marker.

Another subject of the invention is a measurement system comprising an automatic movement means, a contactless detection means arranged on the automatic movement means, a means for recording the spatial coordinates of the automatic movement means and the signals acquired by the detection means, and a data processing means, all of said means being designed to execute the steps of a temporal synchronization method as described above.

An exemplary measurement system may be the one described above and illustrated in FIG. 1, which would furthermore comprise a means for recording the spatial coordinates of the automatic movement means and the signals acquired by the detection means, and a data processing means, all of said means being designed to execute the steps of a temporal synchronization method as described above. An example of suitable data processing means may be a computer or a microcontroller. The recording means may also be a computer or a microcontroller having signal recording interfaces.

The detection means may advantageously be an optical detection means, in particular a chromatic confocal sensor.

The method according to the invention is particularly suitable for systems for measuring an optical parameter along a trajectory on surfaces, in particular curved surfaces, such as those that glass panels may have.

The invention also relates to a computer program comprising instructions and that allows the abovementioned system to execute the steps of a temporal synchronization method as described above.

Any type of programming language compiled in a binary form or that is interpreted directly may be used to implement the steps of the method according to the invention through a sequence of arithmetic or logic instructions able to be executed by a computer or any programmable information processing system. The computer program may form part of an item of software, that is to say a set of executable instructions and/or one or more sets of data or databases.

The computer program may be recorded on a computer-decipherable storage medium. This storage medium is preferable a non-volatile computer memory, for example a magnetic mass memory or semiconductor memory (solid state drive, flash memory). It may be removable or integrated into the computer, which deciphers the content thereof and executes the instructions therein.

The storage medium may be integrated into a remote computer, called "server", different from the one that executes the instructions, called the "client". In order to execute the instructions contained in the storage medium, the "client" computer accesses the memory space of the "server" computer in which the computer program is recorded using an appropriate physical and/or wireless telecommunication means. The "server" computer may also decipher the storage medium on which the computer program is stored and communicate the instructions in binary form to the "client" computer through any telecommunication means.

It may be advantageous for the storage medium to be a removable medium or to be accessible remotely by way of a telecommunication means so as to make it easier to distribute the invention to the locations where it is likely to be used.

The invention claimed is:

1. A method for temporal synchronization between an automatic movement means and a contactless detection means arranged on said automatic movement means in order to measure a physical parameter along at least one defined trajectory on surfaces of a plurality of materials to be evaluated, spatial coordinates of the automatic movement means and a set of signals acquired by the contactless detection means being recorded continuously by a recording means in their respective time scales when the automatic movement means moves, said method comprising the following steps:
    a step (a) of recording, by way of said recording means, of at least one previously defined reference spatial position along said at least one defined trajectory, and of a characteristic signal able to be detected by the contactless detection means, said characteristic signal being associated with said reference spatial position,
    a step (b) of searching, in the set of signals acquired as a function of time by the contactless detection means, fora an instant in time corresponding to the detection of the characteristic signal associated with the reference spatial position;
    a step (c) of searching, in a set of spatial positions of the automatic movement means, recorded as a function of time, for an instant in time corresponding to the reference spatial position;
    a step (d) of translation of the respective time scales of the automatic movement means and of the contactless detection means, such that the instants in time obtained in steps (b) and (c) coincide with one another.

2. The temporal synchronization method as claimed in claim 1, further comprising, after step (d), a step (e) of calculation of a statistical correlation function between the respective time scales of the automatic movement means and of the contactless detection means, and wherein the translation in step (d) is subsequently performed by way of said statistical correlation function rather than the moments in time obtained in steps (b) and (c).

3. The temporal synchronization method as claimed in claim 2, wherein the statistical correlation function is a scale factor.

4. The temporal synchronization method as claimed in claim 1, wherein the reference position corresponds to one and a same point situated on an edge of the surfaces and the characteristic signal is the absence of a signal.

5. The temporal synchronization method as claimed in claim 1, wherein the reference spatial position corresponds to a marker arranged at one and a same location on the surfaces to be evaluated, and the characteristic signal is a signal from said marker.

6. The temporal synchronization method as claimed in claim 5, wherein the marker is a reflector or an electromagnetic signal emitter.

7. A measurement system comprising an automatic movement means, a contactless detection means arranged on the automatic movement means, a means for recording spatial coordinates of the automatic movement means and a set of signals acquired by the contactless detection means, and a data processing means, all of said means being designed to execute steps of a method for temporal synchronization between the automatic movement means and the contactless detection means in order to measure a physical parameter along at least one defined trajectory on surfaces of a plurality of materials to be evaluated, the spatial coordinates of the automatic movement means and the set of signals acquired by the contactless detection means being recorded continuously by the recording means in their respective time scales when the automatic movement means moves, said method comprising the following steps:

a step (a) of recording, by way of said recording means, of at least one previously defined reference spatial position along said at least one trajectory, and of a characteristic signal able to be detected by the contactless detection means, said characteristic signal being associated with said reference spatial position, a step (b) of searching, in the set of signals acquired as a function of time by the contactless detection means, for an instant in time corresponding to the detection of the characteristic signal associated with the reference spatial position;

a step (c) of searching, in a set of spatial positions of the automatic movement means, recorded as a function of time, for an instant in time corresponding to the reference spatial position;

a step (d) of translation of the respective time scales of the automatic movement means and of the contactless detection means, such that the instants in time obtained in steps (b) and (c) coincide with one another.

8. The measurement system as claimed in claim 7, wherein the contactless detection means is an optical detection means.

9. The measurement system as claimed in claim 8, wherein the surfaces of the plurality of materials are curved surfaces.

10. The measurement system as claimed in claim 1, wherein the materials are glass panels.

11. A non-transitory computer-decipherable medium on which there is recorded a computer program comprising program code instructions that allow the system as claimed in claim 7 to execute the steps of the temporal synchronization method.

12. The temporal synchronization method as claimed in claim 1, wherein the automatic movement means include an articulated robotic arm.

13. The temporal synchronization method as claimed in claim 1, wherein the contactless detection means includes an optical detection device.

14. The temporal synchronization method as claimed in claim 1, wherein the recording means includes a computer or a microcontroller.

15. The measurement system as claimed in claim 7, wherein the automatic movement means include an articulated robotic arm.

16. The measurement system as claimed in claim 8, wherein the contactless detection means includes a chromatic confocal sensor.

17. The measurement system as claimed in claim 7, wherein the recording means includes a computer or a microcontroller.

18. The measurement system as claimed in claim 7, wherein the data processing means includes a computer or a microcontroller.

19. A method for temporal synchronization between an automatic movement device that includes a robotic arm and a contactless optical detection device arranged on said automatic movement device in order to measure a physical parameter along at least one defined trajectory on surfaces of a plurality of materials to be evaluated, spatial coordinates of the automatic movement device and a set of signals acquired by the contactless optical detection device being recorded continuously by a computer or a microcontroller in their respective time scales when the automatic movement device moves, said method comprising the following steps:

a step (a) of recording, by the computer or microcontroller, of at least one previously defined reference spatial position along said at least one defined trajectory, and of a characteristic signal able to be detected by the contactless optical detection device, said characteristic signal being associated with said reference spatial position, a step (b) of searching, in the set of signals acquired as a function of time by the contactless optical detection device, for an instant in time corresponding to the detection of the characteristic signal associated with the reference spatial position;

a step (c) of searching, in a set of spatial positions of the automatic movement device, recorded as a function of time, for an instant in time corresponding to the reference spatial position;

a step (d) of translation of the respective time scales of the automatic movement device and of the contactless optical detection device, such that the instants in time obtained in steps (b) and (c) coincide with one another.

* * * * *